April 2, 1940.  W. F. REIBOLD  2,195,999
CONDIMENT HOLDER
Filed April 7, 1939
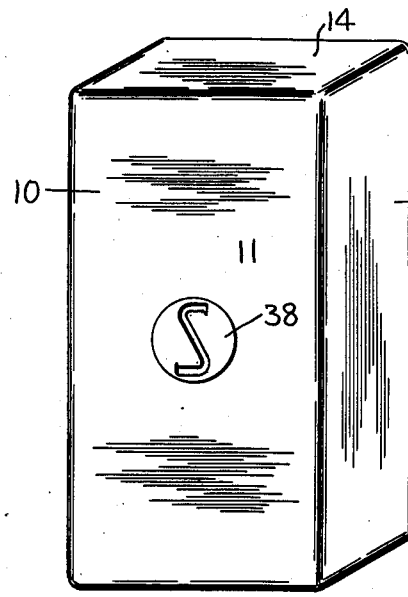
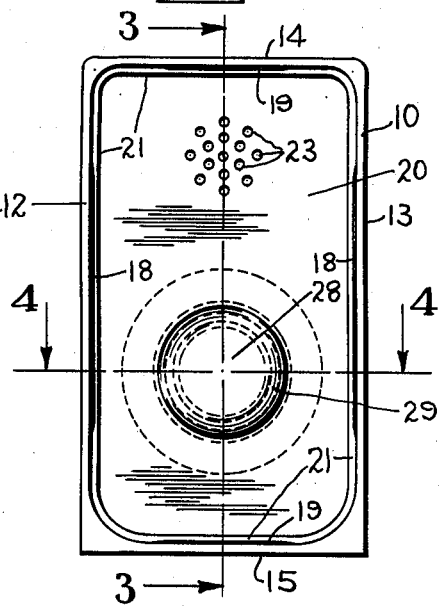
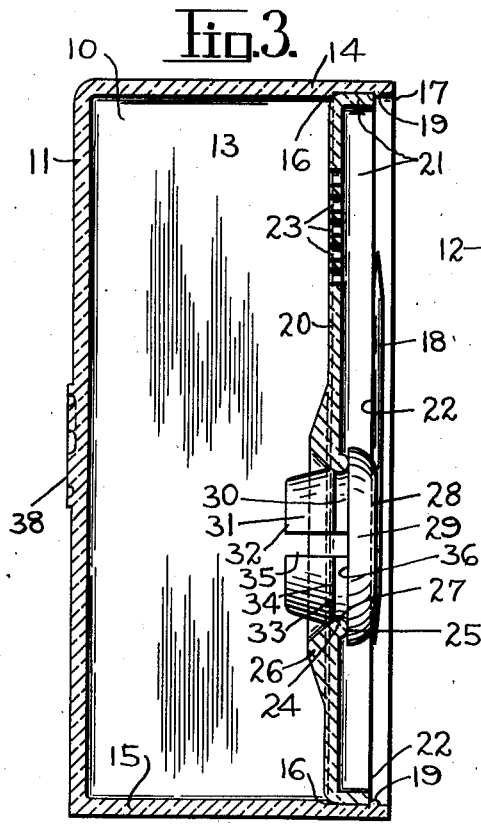
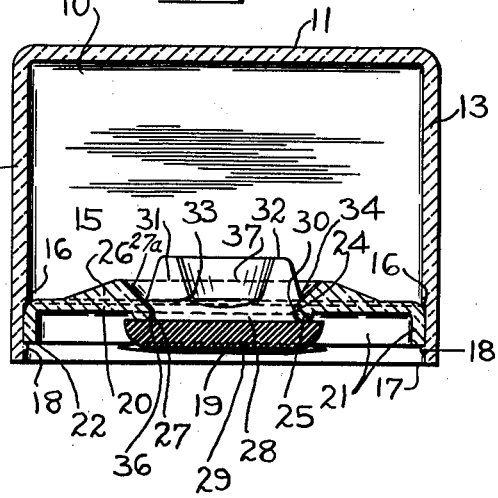
INVENTOR
*Walter F. Reibold.*
BY
ATTORNEY Patented Apr. 2, 1940

2,195,999

UNITED STATES PATENT OFFICE 2,195,999

CONDIMENT HOLDER

Walter F. Reibold, Wolcott, Conn., assignor to The Waterbury Button Company, Waterbury, Conn., a corporation of Connecticut Application April 7, 1939, Serial No. 266,567

3 Claims. (Cl. 65—45)

This invention relates to condiment holders, and more particularly to an improved condiment holder of novel form and construction made of moldable plastic material.

One object of this invention is to provide a condiment holder comprising a one-piece casing open at the back and adapted to be closed by a detachable flanged cover member which is shaped to telescope in said casing.

Another object is to provide a condiment holder of the above nature in which the detachable cover member is perforated near the top thereof for permitting a condiment such as salt or pepper to be shaken therethrough, and also having a relatively large filling opening therebelow, said opening being closed by a removable yieldable plug member.

A still further object is to provide an improved condiment holder of the above nature which will be simple in construction, inexpensive to manufacture, compact, ornamental in appearance, and very efficient and durable in use.

With these and other objects in view, which will appear as the description proceeds, there has been illustrated in the accompanying drawing one form in which the invention may be conveniently embodied in practice.

In the drawing:

Fig. 1 is a perspective view of a condiment holder embodying this invention.

Fig. 2 is a rear view of the same.

Fig. 3 is an enlarged vertical sectional view of the condiment holder taken on the line 3—3 of Fig. 2, looking in the direction of the arrows.

Fig. 4 is an enlarged cross-sectional view of the condiment holder taken on the line 4—4 of Fig. 2, looking downwardly.

Referring now to the drawing wherein like reference numerals designate like parts throughout the several views, the numeral 10 indicates a box-like casing substantially rectangular in shape and having a front wall 11, vertical side walls 12 and 13, and horizontal top and bottom walls 14 and 15 respectively. The casing 10 is preferably made of moldable plastic material, and is provided with a rearwardly facing shoulder 16 molded around the periphery on the inner surfaces of the side walls 12 and 13 and the top and bottom walls 14 and 15. The shoulder 16 is spaced forwardly from the rear edge 17 of the casing 10 and has rounded corners.

In order to lock the cover 20 (now to be described) detachably within the casing, provision is made of two pairs of rounded raised ribs 18 and 19, which are molded on the side vertical walls 12 and 13 and on the end walls 14 and 15 respectively, said ribs being located between the rear edge 17 of the casing and the shoulder 16. The closure member 20 is adapted to close the open rear portion of the casing 10, and said member 20 has a rearwardly directed flange 21 about its periphery. The flanged cover member 20 is adapted to telescope into the casing 10 and seat upon the shoulder 16 in such a manner that the outer rear edge 22 of the flange 21 will be seated in front of the ribs 18 and 19 by a "snap" action, whereby the member 20 is securely retained in place against said shoulder. The upper portion of the closure member 20 is perforated at 23 to provide a plurality of small holes through which the powdered condiment may be shaken.

A relatively large circular filling opening 24 is provided in the lower portion of the closure member 20 for permitting condiments to be introduced into the casing to replenish the supply therein. The filling opening 24 is provided on its rear with an annular convex rib 25 and on its front with a beveled raised conical boss 26. The filling opening 24 adjacent the rear convex rib 25 is rounded at 27 and is connected to the raised front beveled boss 26 by an annular outwardly flaring section 27a.

A removable stopper 28, preferably made of soft flexible yieldable rubber, is provided to close and seal the filling opening 24 in the rear closure member 20. The stopper 28 is provided with a rear convex head 29 which is larger in diameter than the opening 24, whereby it will extend outwardly beyond the annular convex rib 25. The stopper 28 is provided with an intermediate reduced annular groove or neck 30 of proper width to embrace the rounded edge 27 of the opening 24. Forward of the intermediate annular groove 30, the body 31 of the stopper 28 is in the form of a truncated cone, the smaller forward end 32 being of proper diameter to enter the opening 24 and its rear end 33 being somewhat larger in diameter than the opening 24 and forming a rearwardly facing shoulder 34.

The stopper 28 is bifurcated or split by an axially directed slot 35 which extends from its forward end 32 to the forward surface 36 of the stopper head 29 to increase the resiliency of the conical stopper body portion 31 and facilitate the manual forcing of said body portion forwardly through the opening 24. This construction insures that the forward surface 36 of the enlarged stopper head 29 will be drawn tightly against the annular rib 25 to seal the opening 24 by the engagement of the shoulder 34 against the rounded edge 27. To further increase the resiliency of the stopper 28 and to reduce its weight, said stopper is provided with a tapered forward recess 37 which extends rearwardly toward the head 29 in the conical body portion 31. Suitable insignia such as a letter "S" (indicating salt) may be printed, engraved or embossed on a raised circular pad 38, as desired.

One advantage of the present improved condiment holder is that the parts thereof may be readily assembled together merely by pressing the closure member 20 into the open back of the casing 10 to cause the flange 21 to snap in front of the ribs 18 and 19 and seat firmly against the shoulder 16. The cover member 20 will thus be detachably locked in place to seal the open back of the casing 10. Moreover, the rearward spacing of the stopper head 29 from the rear surface of the member 20 by means of the raised convex rib 25 permits the insertion of the user's finger or a suitable flat instrument, and thus greatly facilitates the removal of the stopper 28 from the opening 24.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. A condiment holder comprising a casing open at its back and having an internal rearwardly-facing shoulder extending inwardly from the surface of its casing, said casing also having a raised rib located between said shoulder and the rear edge of said casing, and a closure member having a rearwardly directed flange surrounding its periphery, the walls of said casing being resilient and initially slightly smaller than said closure member and adapted to expand and contract when said closure member is pushed past said rib by a "snap" action, whereby said closure member will seat against said shoulder and be tightly held thereagainst by said rib, said closure member having a perforated dispensing section adjacent the top thereof.

2. In a condiment holder, a rectangular casing open at its back and having the rear portion of its walls reduced in thickness on the interior to form a shoulder facing the rear edge of said casing, raised ribs extending inwardly from all four walls of said casing between said shoulder and the rear edges of said walls, and a detachable closure member having a rearwardly directed flange shaped to fit said reduced walls and adapted to engage and spread said ribs when said closure member is seated on said shoulder by a "snap" action, said ribs serving to tightly hold said closure against said shoulder, said closure member having a relatively large filling opening in its lower portion through which powdered condiment may be introduced and a perforated dispensing section near the top thereof, and a removable flexible plug shaped to close said filling opening.

3. In a condiment holder, a rectangular casing open at its back and having the rear portion of its walls reduced in thickness on the interior to form a shoulder facing the rear edge of said casing, raised ribs extending inwardly from all four walls of said casing between said shoulder and the rear edges of said walls, and a detachable closure member having a rearwardly directed flange shaped to fit said reduced walls and adapted to engage and spread said ribs when said closure member is seated on said shoulder by a "snap" action, said ribs serving to tightly hold said closure against said shoulder, said closure member having a relatively large filling opening in its lower portion through which powdered condiment may be introduced and a perforated dispensing section near the top thereof, and a removable flexible headed plug shaped to close said filling opening.

WALTER F. REIBOLD.